United States Patent
Maloney et al.

(10) Patent No.: US 6,546,256 B1
(45) Date of Patent: Apr. 8, 2003

(54) ROBUST, EFFICIENT, LOCATION-RELATED MEASUREMENT

(75) Inventors: John E. Maloney, Springfield, VA (US); James O. Stevenson, Fairfax, VA (US)

(73) Assignee: KSI Inc., King of Prussia, PA (US)

( * ) Notice: Subject to any disclaimer, the term of this patent is extended or adjusted under 35 U.S.C. 154(b) by 0 days.

(21) Appl. No.: 09/240,889

(22) Filed: Feb. 1, 1999

Related U.S. Application Data

(62) Division of application No. 08/855,589, filed on May 13, 1997, now Pat. No. 6,047,192.
(60) Provisional application No. 60/035,691, filed on Jan. 16, 1997, and provisional application No. 60/017,269, filed on May 13, 1996.

(51) Int. Cl.[7] .............................................. H04Q 7/20
(52) U.S. Cl. ........................ 455/456; 455/422; 342/450
(58) Field of Search .............................. 455/405, 422, 455/440, 441, 446, 456, 457, 507, 577, 524, 526, 67.1, 67.6; 342/357, 451, 457, 362, 378, 456, 461, 450, 417, 387, 388

(56) References Cited

U.S. PATENT DOCUMENTS

| | | | |
|---|---|---|---|
| 4,728,959 A | 3/1988 | Maloney et al. | 342/457 |
| 5,008,679 A | 4/1991 | Effland et al. | 342/353 |
| 5,260,711 A | 11/1993 | Sterzer | 342/375 |
| 5,317,323 A | 5/1994 | Kennedy et al. | 342/457 |
| 5,327,144 A | 7/1994 | Stilp et al. | 342/387 |
| 5,345,468 A | 9/1994 | Bi | 375/1 |
| 5,353,302 A | 10/1994 | Bi | 375/1 |
| 5,512,908 A | 4/1996 | Herrick | 342/387 |
| 5,537,683 A * | 7/1996 | Hill et al. | 340/7.21 |
| 5,565,764 A * | 10/1996 | Priebe et al. | 324/76.21 |
| 5,608,410 A | 3/1997 | Stilp et al. | 342/387 |
| 5,634,199 A * | 5/1997 | Gerlach et al. | 455/63 |
| 5,650,785 A | 7/1997 | Rodal | 342/357 |
| 5,719,584 A | 2/1998 | Otto | 342/465 |
| 5,754,139 A * | 5/1998 | Turcotte et al. | 342/373 |
| 5,802,454 A | 9/1998 | Goshay et al. | 455/31.2 |

(List continued on next page.)

FOREIGN PATENT DOCUMENTS

| | | | | |
|---|---|---|---|---|
| WO | WO 88/01061 | 2/1988 | | G01S/5/02 |
| WO | WO 96/02006 | 1/1996 | | G01S/1/24 |

*Primary Examiner*—Thanh Cong Le
*Assistant Examiner*—Pablo N Tran
(74) *Attorney, Agent, or Firm*—Woodcock Washburn LLP

(57) ABSTRACT

Replica correlation processing, and associated representative signal-data reduction and reconstruction techniques, are used to detect signals of interest and obtain robust measures of received-signal parameters, such as time differences of signal arrival and directional angles of arrival, that can be used to estimate the location of a cellularized-communications signal source. The new use in the present invention of signal-correlation processing for locating communications transmitters. This enables accurate and efficient extraction of parameters for a particular signal even in a frequency band that contains multiple received transmissions, such as occurs with code-division-multiple-access (CDMA) communications. Correlation processing as disclosed herein further enables extended processing integration times to facilitate the effective detection of desired communications-signal effects and replication measurement of their location-related parameters, even for the communications signals modulated to convey voice conversations or those weakened through propagation effects. Using prior, constructed, signal replicas in the correlation processing enables elimination of the inter-site communications of the signal representations that support the correlation analyses. Reduced-data representations of the modulated signals for voiced conversation, or for the variable components of data communications, are used to significantly reduce the inter-site communications that support the correlation analyses.

18 Claims, 9 Drawing Sheets

U.S. PATENT DOCUMENTS

| | | | |
|---|---|---|---|
| 5,815,117 A | * 9/1998 | Kolanek | 342/442 |
| 5,844,522 A | 12/1998 | Sheffer et al. | 342/457 |
| 5,883,598 A | * 3/1999 | Parl et al. | 342/457 |
| 5,890,068 A | * 3/1999 | Fattouche et al. | 455/456 |
| 5,959,580 A | * 9/1999 | Maloney et al. | 342/457 |
| 5,982,808 A | * 11/1999 | Otto | 375/204 |
| 6,006,110 A | * 12/1999 | Raleigh | 455/561 |
| 6,025,799 A | * 2/2000 | Ho et al. | 342/374 |
| 6,047,192 A | * 4/2000 | Maloney et al. | 342/450 |
| 6,101,399 A | * 8/2000 | Raleigh et al. | 455/561 |
| 6,236,363 B1 | * 5/2001 | Robbins et al. | 342/169 |
| 2001/0046255 A1 | * 11/2001 | Shattil | 375/142 |

* cited by examiner

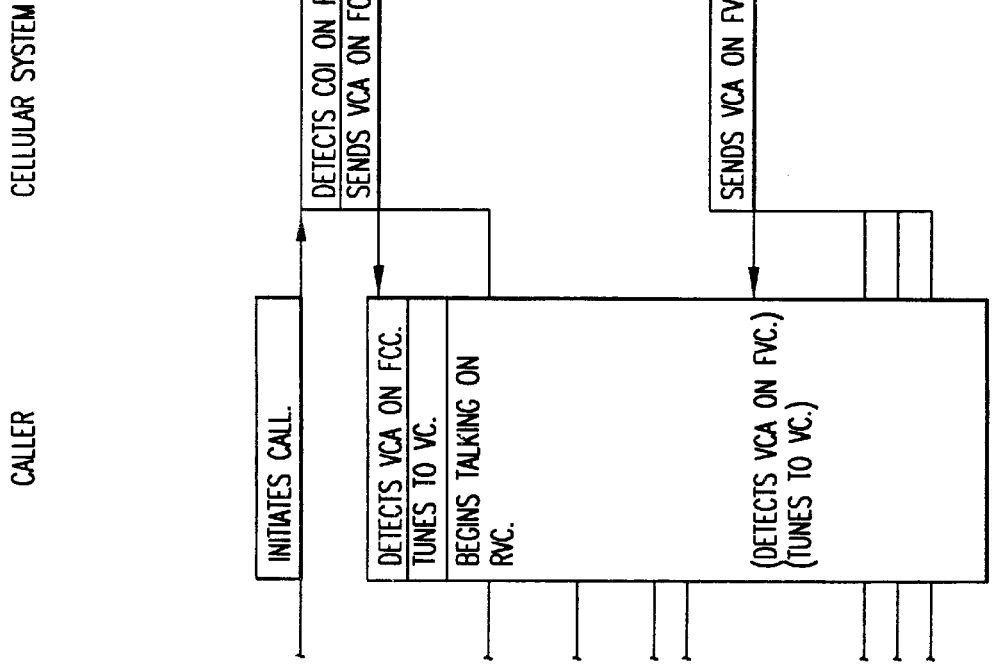

ROBUST, EFFICIENT, LOCATION-RELATED MEASUREMENT

RELATED APPLICATIONS

This application is a divisional application of Ser. No. 08/855,589 filed May 13, 1997, now U.S. Pat. No. 6,047,192 issued Apr. 4, 2000, which claims the benefit of Provisional Applications Ser. No. 60/017,269 filed on May 13, 1996 and Ser. No. 60/035,691 filed on Jan. 16, 1997.

BACKGROUND AND SUMMARY OF THE INVENTION

Determining the location of standard, wireless radio frequency (RF), communications transmitter/receivers ("transceivers") based on their communications offers the potential for emergency response services (fire, rescue and police) to more rapidly respond to calls for help. Public safety and private security can all be aided by making available information concerning position and geographic location. Technologies, such as those disclosed herein, do not require modifying standard communications devices in any way to facilitate the real-time determination of their locations.

The communications transceivers most popularly used by the general public are the mobile units (i.e., "telephones") of cellularized communications systems. Examples included the "cellular telephone" and "personal communications service" (PCS) systems. Cellular communications systems typically use control-data messages to "manage" the transmitted power level of a mobile unit to limit its transmitted level to only that needed for successful communications reception within the controlling local "cell." This power management can limit the reception of the communications transmissions at multiple receiver sites and thus make more difficult the task of determining the transmitter's location. Furthermore, when in use for communication, the wireless telephones are dedicated to voice or "traffic" transmission channels rather than control or "access" channels. Thus, facilities are needed to locate the transmitters on any type of channel.

The present invention addresses these issues by providing robust and efficient means to extract parametric measurements from either or both of voice and control communications signals. These measurements can then be used to support the localization processing that is needed to locate wireless communications transceivers. Location data can be used to rapidly rout wireless calls to someone, or some agency, who is in a position to respond to the call. Thus, the location information can support swift response to wireless emergency "9-1-1" calls. Other requests, such as for non-emergency assistance or position-related, "yellow pages" information, also can be addressed. Motion data can be generated from the location data; such data can be used for monitoring transportation congestion as well as for vehicle fleet management.

The present invention can advance the performance and cost efficiency of a variety of system approaches to the localization of standard, wireless, mobile communications transmitters. Various techniques have been disclosed that are intended to provide the utility and meet the need of such systems. As the pioneer of such technologies, U.S. Pat. No. 4,728,959 discloses, among other novel features, a system with a means for measuring a direction angle of the mobile radio transmitter station from at least two land stations by phase difference measurement, including means for performing a phase sensitive weighted integration of a complex conjugate product of an equivalent signal in each antenna element. This allows for, among other things, measuring the angle-of-arrival (AOA) of a signal from a mobile transceiver based on the covariances of the elemental signals received with phased arrays at distributed sensor sites, and to thereby obtain and provide the location of a standard mobile communications transmitter.

The present invention advances the state of the art in AOA systems by using matched-replica correlations to enhance their robustness and to extend the applicability of such fundamental concepts into the domain of severe co-channel interference. Co-channel interference is a particular problem and inherent with a type of digital communication system known as code-division-multiple-access (CDMA) communications. Systems exist which purport to provide locations for standard mobile transmitters by extracting measurements from "beamformed" signals using time-difference-of-arrival (TDOA) correlations of the direct, sampled, representations of the signals themselves, given sufficient signal bandwidth (which is often not available from most commercial "analog" transceivers). The transmitting may (adaptively) mitigate some multipath signal propagation effects. However, to actually implement such correlation processing, the sampled signal representations must be collected at a common correlation site. Such signal collection requires supporting "back-haul" communication of the significant volumes of data that make up the representations of the sampled signals.

It is an objective of the present invention to extend the utility of AOA and TDOA- based localization concepts so as to be applicable to signals that are not necessarily the product, and do not entail the expense, of beamforming. It is also an objective of the present invention to advance the effectiveness of the correlation processing through the use of matched-replica processing, which provides a distortion-free representation of the signal to the correlator for enhanced correlation detectability. It is also an objective of the present invention to improve the efficiency of the integrated system processing by eliminating the need for any inter-site back-haul communication of representative signal data when the signal replica can be locally derived from the received signal and/or from a known stored replica. It is also an objective of the present invention to significantly reduce the quantity of representative signal data that is transferred between sites through the extraction and use of the demodulated forms of the information content that is in the RF transmissions for all forms of modulation.

U.S. Pat. No. 5,327,144 discloses a system with purports to measure signal time-of-arrival (TOA), and associated time-difference-of-arrival (TDOA) approach using what is described as correlation processing. However, the technique described requires extensive inter-site, back-haul communications of sampled signal representations or the less extensive demodulated replicas. Such communications are apparently used to provide locations for standard mobile transmitters in cellularized communications "systems that employ analog control channels," through the exploitation of the short-duration, "bursty" (control) signals. In the United States, the "analog" signal formats, for the "air interface" between the mobile transceiver and the communications system infrastructure use the Advanced Mobile Phone System (AMPS) specification. The AMPS control messages occur in bursts that are approximately one tenth of a second in duration.

The present invention enhances the utility of the correlative derivation of any measurements by eliminating requirements for bursty, analog, control signals and for the back-haul communications of signal representations. The present invention further extends the applicability of the matched-replica processing to enable the processing of signals of "continuous" or opportunistic (rather than merely induced or transponded) transmissions as well as of transmissions of digital formats, such as of voice signals in CDMA systems. Furthermore, the present invention also extends matched-replica correlative processing to provide robust and efficient measures of AOAs, as well as TOAs or TDOAs, for all of the communications signal formats.

The present invention provides a system that effectively determines location-sensitive parameters for, and locates and/or tracks, a standard, mobile-communications, radio transmitter in a cellularized communications system. The system uses replica correlation processing, and associated representative signal-data reduction and reconstruction techniques, to detect signals of interest and obtain robust measures of location-related, received-signal parameters, such as time differences of signal arrival (TDOAs) and directional angles of arrival (AOAs), for the estimation of the locations of cellularized-communications signal sources. The new use in the present invention of signal-correlation processing to support the localization of the communications transmitters enables accurate and efficient extraction of parameters for a particular signal even in a frequency band that contains multiple received transmissions, such as occurs with code-division-multiple-access (CDMA) communications.

The use in the present invention of correlation processing further enables extended processing integration times to facilitate the effective detection of desired communications-signal effects and enhanced measurement of their location-related parameters, even for the communications signals modulated to convey voice conversations or those weakened through propagation effects. When derivable from the received transmissions themselves, such as with sufficiently strong modulated signals representing digital information, or when otherwise available, such as with communications-control or other known-data contents in the received transmissions, the use in the present invention of reconstructed signal replicas in the correlation processing enables elimination of the inter-site communications of the signal representations that support the correlation analyses. The use in the present invention of reduced-data representations of the modulated signals for voiced conversation, or for the variable components of data communications, significantly reduces the inter-site communications that support the correlation analyses. Thus, the present invention significantly enhances the robustness, applicability, and efficiency, and reduces the cost of implementation, of correlation techniques for the detection and measurement of signal parameters to support the localization and tracking of the wireless communications transmitters used in cellularized or geographically subdivided communications systems.

All of the foregoing objectives, features and advantages of the present invention, and more, are explained below with the aid of the following illustrative figures and exemplary embodiments.

BRIEF DESCRIPTION OF THE DRAWINGS

FIGS. 8A and 8B. Localization System Functional Control Flow, exemplifying one localization system configuration, involves the assignment by the control site of data collection and reporting responsibilities for the sensor sites, and calculation of localization estimates at the control site based on the reported measurement data.

DETAILED DESCRIPTION

Figure 1:
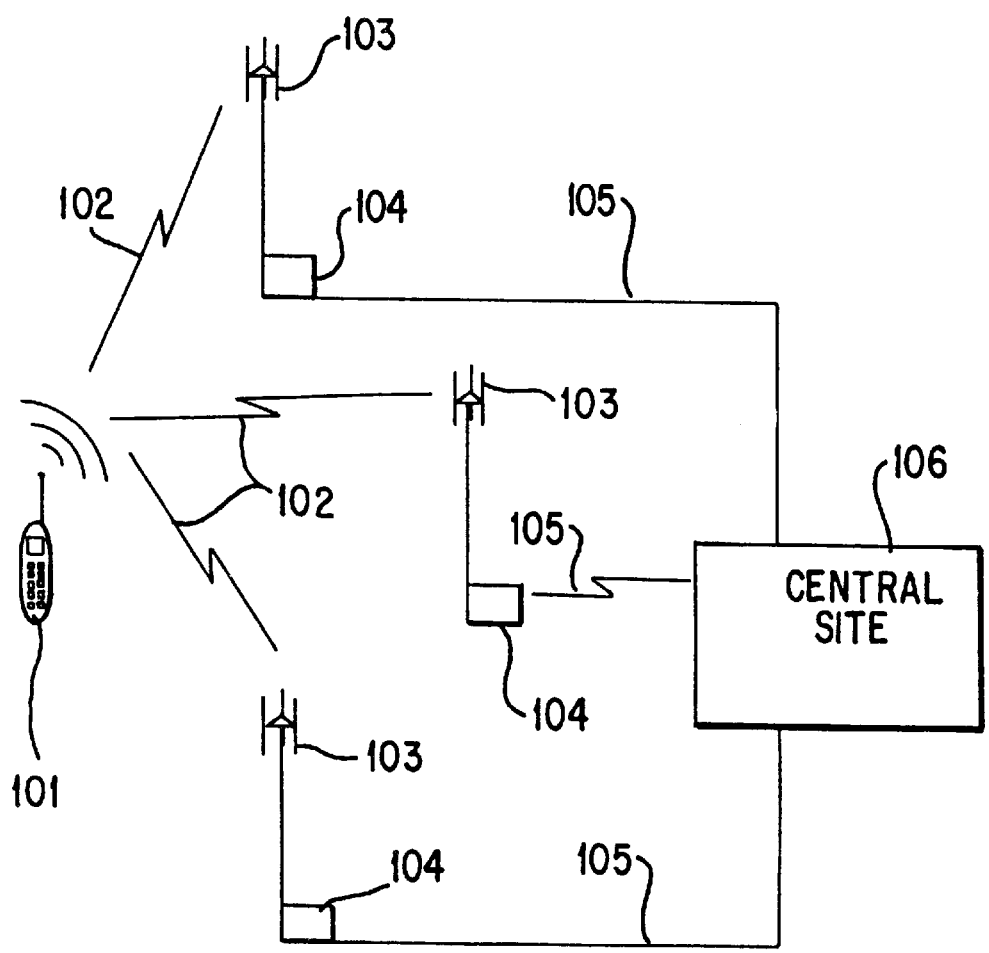
FIG. 1. An Operational System Configuration is shown with the reception of the transmissions from a mobile wireless communications unit at the networked antenna sites of an integrated localization system.

Locations of transmitters of RF signals can be determined from the geometric interpretation of measurements of parameters such as the differences in the times of arrival or the directional angles of arrival of their signals at multiple receiving sites of known location. FIG. 1 depicts a RF transmitter 101 transmitting a signal 102 that is received with antennas 103 serviced by a network of sensor sites or stations 104 distributed throughout the region of operation of the transmitter. As indicated for the transmitter shown, the transmitters to be located may be mobile, wireless, communications units, such as the telephones used in cellular or personal communications services systems. The sensor stations are connected via "back-haul communications" links 105 to at least one central site or control station 106 at which the time-difference or angle data collected from the sensor sites can be analyzed to provide the estimated locations, motions, and associated uncertainties for the transmitters of interest. In a wireless-communications system, the links 105 are called "back-haul" because they provide the mechanism for the background, supporting communications of information among the distributed stations that are necessary to support the primary RF communications 102 transmitted to and from the communications units.

1. Time-Related Measurements

Figure 2:
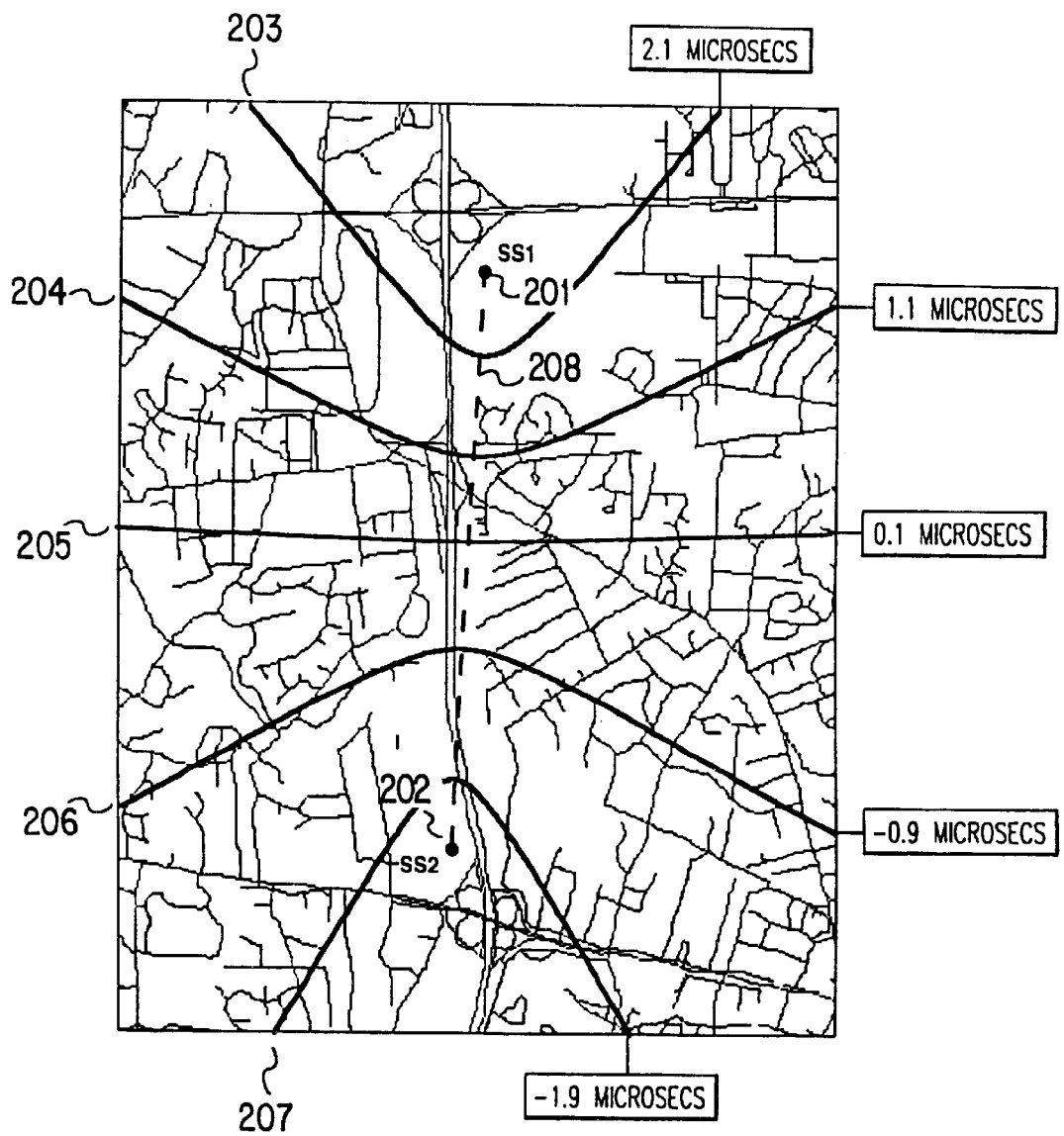
FIG. 2. Time-Difference-Of-Arrival Geometric Relations for two sensor sites are shown as hyperbolic lines representing the loci of positions ascribable to the distinct, constant range differences associated with the various time differences.
Figure 3:
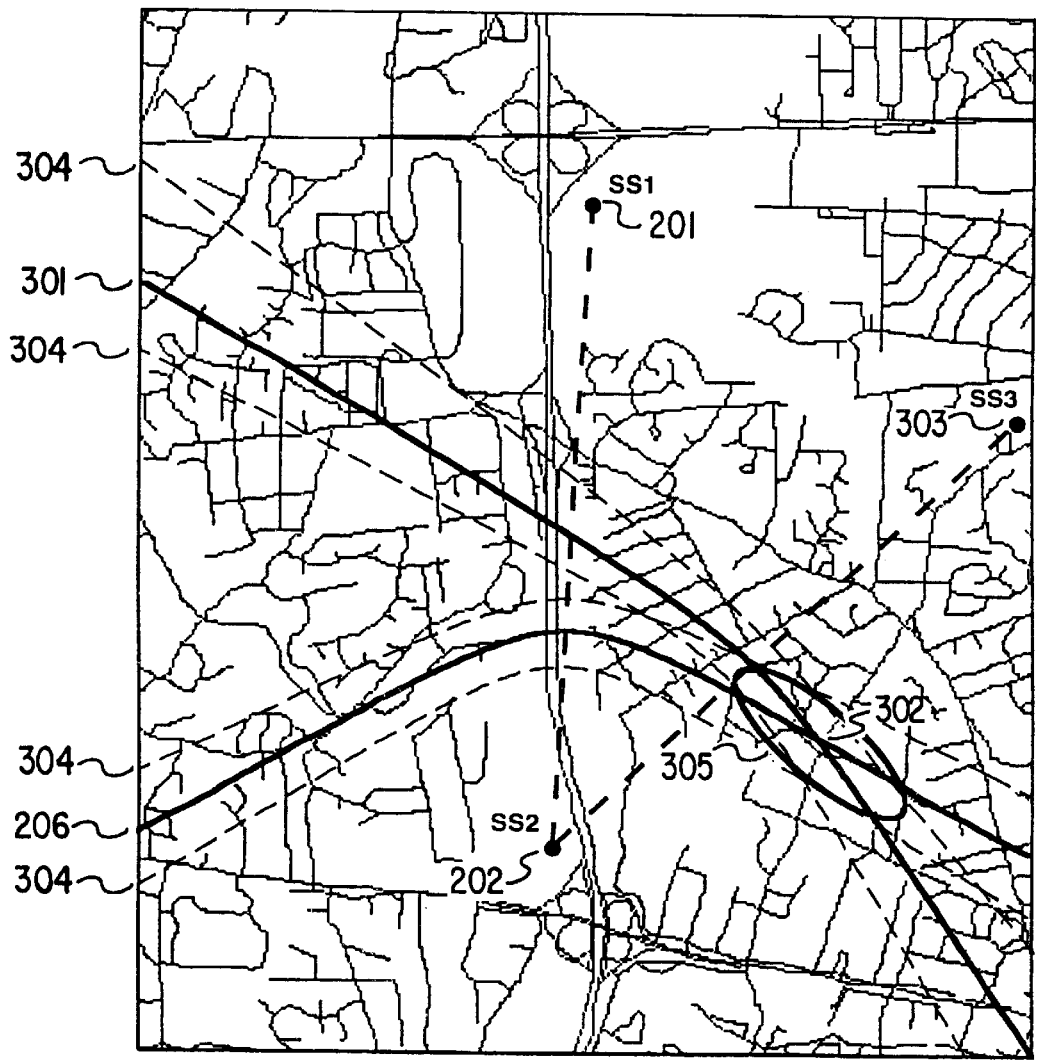
FIG. 3. Time-Difference-Of-Arrival Localization is represented by the intersection of two hyperbolas that are associated with the time differences associated with two distinct pairs formed from three sensor sites.

With the time-related measurements, the facility for localization can be seen in the relation that a time-difference-of-arrival (TDOA) value between signals received in common at a pair of sites (e.g., numbered 1 and 2) has to the ranges or distances between the locations of the signal receivers and the location of the signal transmitter. With the presumption that the speed of signal propagation is approximately the speed of light c, then the TDOA $t_{12}$ between sites 1 and 2 is $$t_{12} = (r_1 - r_2)/c$$

where $r_1$ and $r_2$ are the ranges from the transmitter location to the locations of the receiving antennas for sites 1 and 2, respectively. In a simple, flat, two-dimensional representation, the range difference obtained by multiplying the TDOA by c defines a hyperbola along which the transmitter is located. That is, a single TDOA measurement specifies a hyperbolic locus of possible transmitter locations. FIG. 2 depicts the geometric relations involved in TDOA measurements obtained with two sensor sites 201 and 202, shown at locations labeled SS1 and SS2 at the top and bottom of FIG. 2, respectively. The hyperbolas denoted by the dark lines 203 through 207 are the loci of possible transmitter locations associated with various TDOA values, which are distinct for each line. The hyperbolas are symmetric with respect to the two sides of the inter-site baseline 208 denoted by the dark dashed line between the two sensor sites. As a simple example, a single TDOA value of zero would indicate that there is no difference in the ranges of a transmitter to each of the two sensor sites, and the associated locus of possible locations for the transmitter would be the straight-line, perpendicular bisector of the inter-sensor baseline. The hyperbola 205 nearly approximates this bisector. Of course, as seen in FIG. 2, when only TDOAs involving just two sites are available, the transmitter location cannot be determined more specifically than on a hyperbola extending around the world. With the reception of the signal at a third, non-colinear site 303, as shown in FIG. 3, another TDOA measurement, e.g., between sensor site 1 and 3, can be obtained that defines another hyperbola 301 which can cross with the first one 206. The location 302 of intersection of the two distinct hyperbolas can be calculated from the two associated TDOA measurements. As with any measurements, the measurements of TDOAs are obtained with inherent inaccuracies or uncertainties that accrue from the signal-propagation and measurement-equipment characteristics. These uncertainties are represented in FIG. 3 by the light, dashed lines 304, and from these uncertainties the uncertainty region denoted by the dark ellipse 305 can be calculated for the intersection of the hyperbolas to represent the accuracy of the location estimate for the transmitter.

2. Direction-Related Measurements

Figure 4:
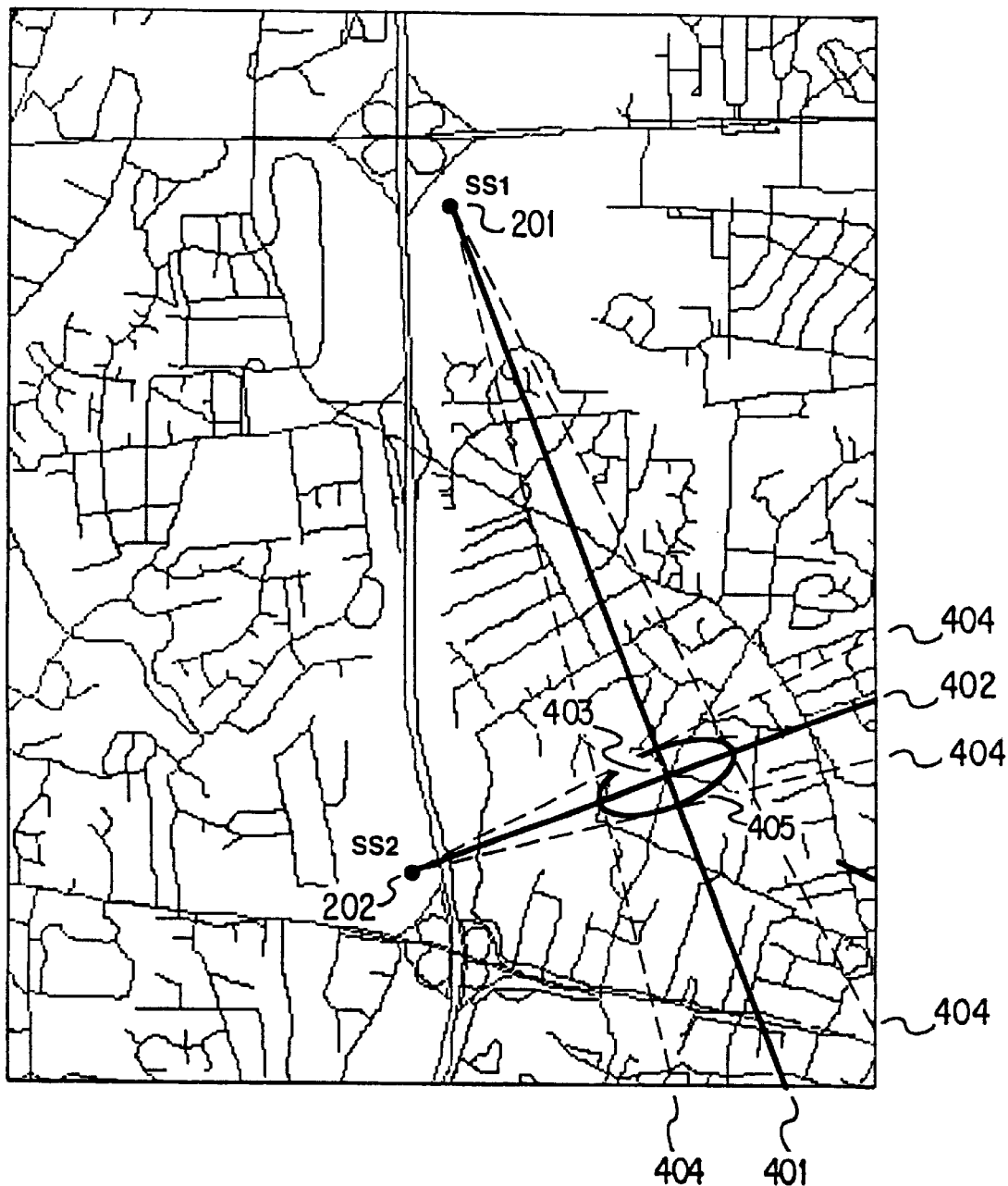
FIG. 4. Angle-Of-Arrival Localization is represented by the intersection of two non-colinear lines of constant bearing associated with angles of signal arrival at two distinct sensor sites.

With the direction-related measurements, the facility for localization can be seen in the relation that the angle-of-arrival (AOA) values for signals received in common at a pair of sites (e.g., numbered 1 and 2) has to the location of the signal transmitter and the locations of the signal receivers. As represented in FIG. 4, each angle measurement individually specifies a line of bearing (LOB), 401 and 402, along which the probable position of the transmitter may be located. The probable location 403 can be determined from the intersection of two or more such LOBs, and the uncertainties 404 in the angles and associated LOBs can be used to calculate the ellipse 405 representing the uncertainty region for the location estimate. Without any other information, (only) two such LOBs associated with the angles from two antenna sites are required to obtain a location estimate. The procedures for applying such direction-finding techniques for the localization of cellularized communications transceivers are described, for example, by Maloney, et al., in U.S. Pat. No. 4,728,959 ("the '959"), for the Direction Finding Localization System (DFLS).

3. Correlation Processing

For a signal source, such as a cellular telephone, the accuracy of its location determined from measurements of differences in times of signal arrival or of directions of signal arrival at known locations is directly related to the accuracy of the applied TDOA and AOA measurement processes. It is well known [e.g., Weiss and Weinstein, "Fundamental Limitations in Passive Time Delay Estimation—Part I: Narrow-Band Systems," IEEE ASSP, 31, pp. 472–486, 1983, and related references] that the optimum TDOA measurement accuracy achievable in the processing of received signals is the Cramer-Rao bound, and that the process of signal "cross-correlation" (discussed below) inherently achieves the Cramer-Rao bound with optimal detectability under normal signal and noise conditions. Thus, the standard signal processing approach applied in TDOA estimation is the process of signal correlation. It is further well known [e.g., H. L. Van Trees, "Detection, Estimation, and Modulation Theory, Part I," New York: Wiley, 1968, and related references] that the ability to even detect the presence of a desired signal embedded among the normal additive noise and interference of other signals is optimized with a use of correlation processing, to emphasize those signal components that are "coherent" or "correlated" with (i.e., similar to) the desired signal and to "integrate out" or "average away" the components that are not desired or of interest. Signal detection devices employing the correlation process are referred to as "correlation receivers." Thus, the correlation process can be used both to achieve detection, in the presence of co-channel interference or at multiple receiving stations, and to extract measurements in support of localization analyses.

The signal correlation process is simply represented by the equation for the correlation function of the inter-signal time delay or "lag," t:

$$R_{12}(t \mid t_0, T) = \frac{1}{T} \int_{S(t_0,T)} x_1*(s) \, x_2(s+t) \, ds / \text{Norm}$$

$$= \frac{1}{T} \int_{t_0-T/2}^{t_0+T/2} x_1*(s) \, x_2(s+t) \, ds / \text{Norm}$$

where $x_1(\ )$ and $x_2(\ )$ are the zero-mean analytic signal waveforms representing the sets of sampled signals between which the time difference is desired; the integral is a "summation" of the product of the two signal waveforms; the integrated sum is calculated over the set $S(t_0,T)$ representing the time (instants) centered at $t_0$ spanning the interval T: i.e., in mathematical set notation, $S(t_0,T)=\{s \mid t_0-T/2 < s < t_0+T/2\}$; ds is the time differential of the integration variable; and "Norm" is a normalization factor that is typically chosen so that the correlation coefficient (i.e., the function value for any particular lag, t) has a magnitude not greater than unity: i.e., $|R_{12}(\ )|$ is less than or equal to one. Without the normalization factor, this correlation is a temporally averaged estimate of the "covariance" between the two signals. The efficacy and properties of the correlation function are well known, as cited in the references above, and are not the subject of the present patent.

Although apparently complex in form, the above formulation for the correlation function provides the desired properties for the detection of signals and the analysis of the time differences between signals, as can be seen from the following discussion. Signal waveforms can have a broad variety of characteristics, but can be generally characterized as falling between two extremes: perfectly ordered and perfectly random. In either case the signals are assumed to have zero mean, since any non-zero constant average or "DC-bias" value can be subtracted or "blocked" from the signals. Thus, the signals may be thought of as "bipolar,"

with approximately half of their values positive and half negative. The "ordered" signal may be said to be sinusoidal, such as with an unmodulated "carrier" of potential communications, while the "random" signal is entirely unpredictable, such as with a thermal-noise like signal. With either type of signal, the product of an arbitrary time alignment of two such signals is generally also bipolar, and the integration of such a product averages the positive values with the negative values and results in a small accumulated sum (i.e., the correlation coefficient magnitude is close to zero). This could obviously occur in the correlation described above, for example, when the two signals involved are entirely random and dissimilar or when the signals are sinusoidal, but of sufficiently different frequencies. This could also occur even when the two signals involved in a correlation calculation are copies of the same random or sinusoidal signal, but are not properly time aligned. On the other hand, when the two signals being correlated are effectively the same signal but with a time offset between them, then the correlation function may be evaluated for the particular time delay value $t_{21}$ that causes signal copy 1 to be aligned with signal copy 2 such that whenever the copy 1 value is positive or negative then the corresponding copy 2 value is likewise positive or negative. For this particular time delay value, all of the non-zero signal products accumulated in the integration would be positive (i.e., the product is "unipolar") and the magnitude of the correlation coefficient would be correspondingly large (i.e., nearly one). Since each (analog) receiver produces a signal that is not a perfect copy of the transmitted signal (due to receiver self noise, as well as to received interference and signal-propagation distortion), then the correlation of the signals received at separated sites will not be perfect (i.e., will not produce a magnitude of exactly one). Nevertheless, the detection of the presence of a desired signal can be indicated by the strength or magnitude of the correlation function, and the fundamental measure of the TDOA between two signals can be taken to be the inter-signal time delay value that maximizes the magnitude of the signal cross-correlation function.

4. Correlation and Detectability (Integration Time)

The ability of the correlation receiver to detect the desired signal in the presence of noise and interference is limited by the correlation integration time (CIT) interval, and enhanced detectability can result from longer "coherent" CITs which further "average away" interference and noise effects. For the detection of multi-site reception, e.g., to support localization, the duration of the CIT can be extended to include whatever duration of signal is required, to reliably decorrelate non-coherent noise or interference. This extension in CIT for multi-site reception can be obtained through the use in the correlation of the matched replica received from a remote site or locally derived or known in advance at each site, e.g., for a specific communications protocol message content. For communications reception, the duration of the data that can be effectively integrated in the correlation interval, i.e., the maximally useful CIT, is limited to the maximum interval of the communicated message that is known to the correlation receiver in advance of the transmission. With the random message patterns that occur with voice transmissions, this CIT maximum for communications reception is the duration of the signal used to transmit one message unit, e.g., bit or bit tuplet.

5. Example: "Matched-Replica" Correlation Inherent In CDMA Reception

An example of the detection capability of the correlation function is found in the correlation receivers that are used to receive code-division-multiple-access (CDMA) RF communications signals. When the signals are similar, the correlation coefficient is large, and the converse occurs for dissimilar signals. The correlation function provides the means to detect and measure the degree of similarity between signals, as well as the time delay between the signals. In CDMA and similar "spread-spectrum" communications, each digital message that is to be transmitted is "encoded" through the use of a high-bandwidth or spread-spectrum, signal that is "known" to the receiver to represent each bit (or bit pair or bit tuplet) in the message bit stream. For example, if the message is encoded by individual bits, then a known signal could be used to represent each "1" and another known signal (e.g., the inverse or complementary correlation signal) could represent each "0." The composite signal for transmission is formed by sequentially stringing together the representative waveforms for the desired sequence of bits, and this signal is transmitted. In accord with the Telecommunications Industry Association and Electronic Industries Association Interim Standard TIA/EIA/IS-95 specification for CDMA systems in the U.S., the encoded bit sequences are transformed for RF transmission using quaternary quadrature-phase-shift keying (QPSK) for representing bit pairs ("00," "01," "10," and "11"). A correlation receiver can correlate its own "matched replica" of the signal "codes," e.g., distinctly those for "1" and "0" or for the bit pairs, with its received signal, and can thus reconstruct (such as by remodulating) the intended message by creating the bit stream that corresponds to large correlations of the received signal with the matched replicas inherent to the system. For the transmission of its particular message bit stream, each transmitter uses unique "codes" or signals that do not correlate well with those used by other transmitters in the system. For the reception of the intended bits, each receiver can correlate with any replicas in use, and thus can receive a signal from any of the multiple transmitters in a common frequency band. Starting from the replica signals used by the transmitters, the received signal is distorted by the conversion to RF at the transmitter location and is combined with noise and interference and distorted in reception at the receiving site. The receiver's matched replica itself provides a largely uncorrupted form of the intended transmitted signal for use in the correlation process.

6. Correlation and Measurement Extraction

When the correlation process described above is used to establish enhanced signal detection, it can also be adapted to extract robust measurements of signal parameters other than TDOAs, such as AOAs, signal strength, and Doppler ratios. For example, in a preferred embodiment, with the use of a receiving antenna configured as a "phased array" of two or more elements (from which the elemental signals are received using phase-locked oscillators, as described in the '959 patent), the signals, $x_1(t)$ and $x_2(t)$, from elements 1 and 2 in the antenna at a single station may be received by correlation at a small (possibly varying) delay offset $t_{max}(s)$ with a replica signal, $x_0(t)$, to obtain coefficient series $R_{01}(t_{max}(s)|s,T)$ and $R_{02}(t_{max}(s)|s,T)$, respectively. The delays $t_{max}(s)$ are "small" in comparison with the CIT, T, used to evaluate the correlations and are the delay offsets associated with the local correlation extrema at which the successfully detected correlation occurs. Due to noise, distortion, and signal propagation effects (such as multipath propagation), the extremal values $t_{max}(s)$ may vary from one correlation to the next. Then, through relations such as described in the '959 patent, the angle of signal arrival can be derived from the phase differences between the various element correlation coefficients. That is, in a manner analogous to those presented in the '959 descriptions for analysis with two elements, the AOA relative to the angle of the bisector of the inter-element baseline can be derived from the "argument" of the complex average over a time interval S of the conjugate product of the correlation coefficients:

$$\sin(AOA - bisector) \approx \frac{1}{kb} arg\left[\frac{1}{S}\int R_{01} * (t_{max}(s) \mid s, T) R_{02}(t_{max}(s) \mid s, T) ds\right]$$

where k is the wavenumber (two pi divided by the wavelength) of the signal, b is the (baseline) inter-element separation, and the "arg" function in this application extracts the phase of the (e.g., zero-lag) correlation of the correlation coefficients themselves. Other uses of correlation results, exploiting the enhanced detectability and accuracy that derive from the correlation processing, can be applied to equivalently extract AOA measurements with alternative but related and equivalent expressions, such as those that adaptively exploit the pairwise covariances among the multiplicity of correlation coefficients derivable from the multiple elemental signals from a phased-array antenna. Thus the correlation results can also be applied in beamforming with phased-array antennas, e.g., in the same manner as described above for AOA measurements, to obtain all of the advantages of spatial separation ("spatial division multiple access"—SDMA) that accrue through beamforming for both localization and communication. Similarly, to further support localization determinations, the correlation results can be used to extract measurements of other signal parameters, such as measures of signal strength, which are directly related to the correlation coefficients, or Doppler ratios, which are directly related to rates of change of the time differences.

7. Autonomous Vs. Cooperative Processing ("Back Haul")

Figure 5:
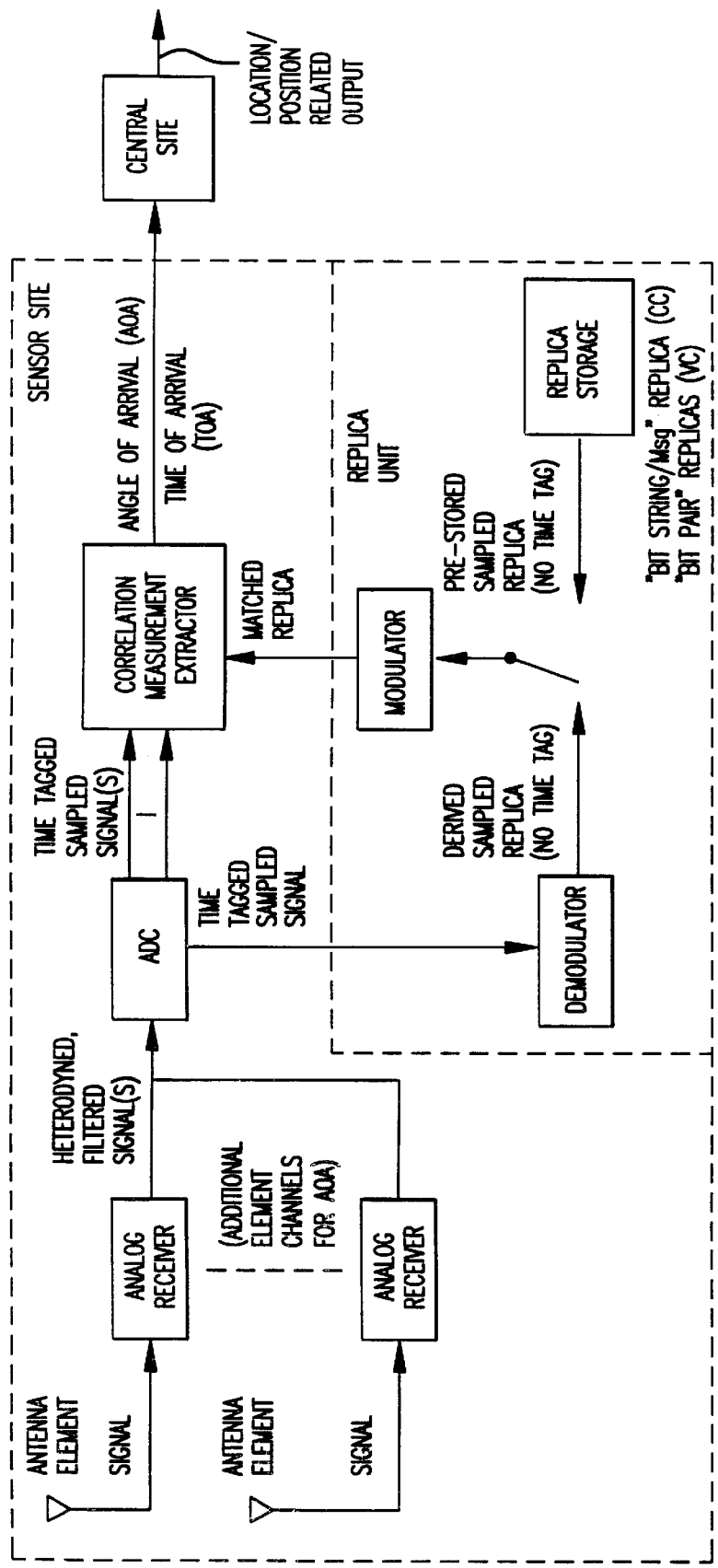
FIG. 5. Autonomous Sensor-Site Operation and data flow is shown in which the received signal is routed to a correlation with a locally derived or stored matched replica for the extraction of angle- and/or time-of-arrival measurements to support centrally estimated locations.

In order to apply the correlation process to detect the joint or common reception of a signal at separate sites and/or to measure the TDOA or AOAs for two separate signals received at separate sites, both signals must be available in common to the correlator or the "known" signal waveform must be available in common to separate correlators. For the measurement of a direction of signal arrival at each site, the results of the correlated reception of signals from the multiple "phased" elements of its directional receiving antenna are used to derive the "phase-based" AOA measurement, in the manner discussed above and analogous to that described in the '959 patent. For the measurement of the TDOA between the signal representations received at two sites, both signals are used in a common correlator or the "known" signal waveform is used in separate correlators, each of which determines a Time Of Arrival (TOA) from which the difference can be obtained by subtraction. FIG. 5 represents the functional component configuration and data flows applied in the autonomous sensor-site operation in which a "known," locally derived or stored replica is used in the correlation processing to obtain AOA or TOA measurements, as described above and elaborated further below. In the represented embodiment, the antenna element responds to the RF signal and produces the varying voltage of the analog signal that is "conditioned," received, and routed to the analog-to-digitial converter (ADC) for "digitization" into sequential, "time-series" samples. The correlation measurements are derived from the digital correlation of the received signal samples with the sampled, modulated, matched replica of the transmitted signal. As discussed further below, this operation can be applied where a known message or bit-string replica is used in correlation with a-priori known parts of the control/access-channel sampled signal, or where overhead bit sequences such as are involved with communications synchronization, command acknowledgment, and/or contact management are used in correlation with the voice/traffic-channel sampled signal. This operation can even be applied where bit-pair replicas are used in correlating with the sampled voice-channel signal (i.e., with all digital air-interface formats to obtain TOAs, and with CDMA signals to obtain AOAs). Where reliable demodulation can be achieved and extended CITs for enhanced time-tag accuracy are warranted, the modulated replica can be derived locally from the demodulation of the received signal, in analogy with the demodulation flow discussed below for cooperative site processing. In either approach for this autonomous operation, no "backhaul" communications are needed to provide the replica information for the support of the correlation analyses.

Figure 6:
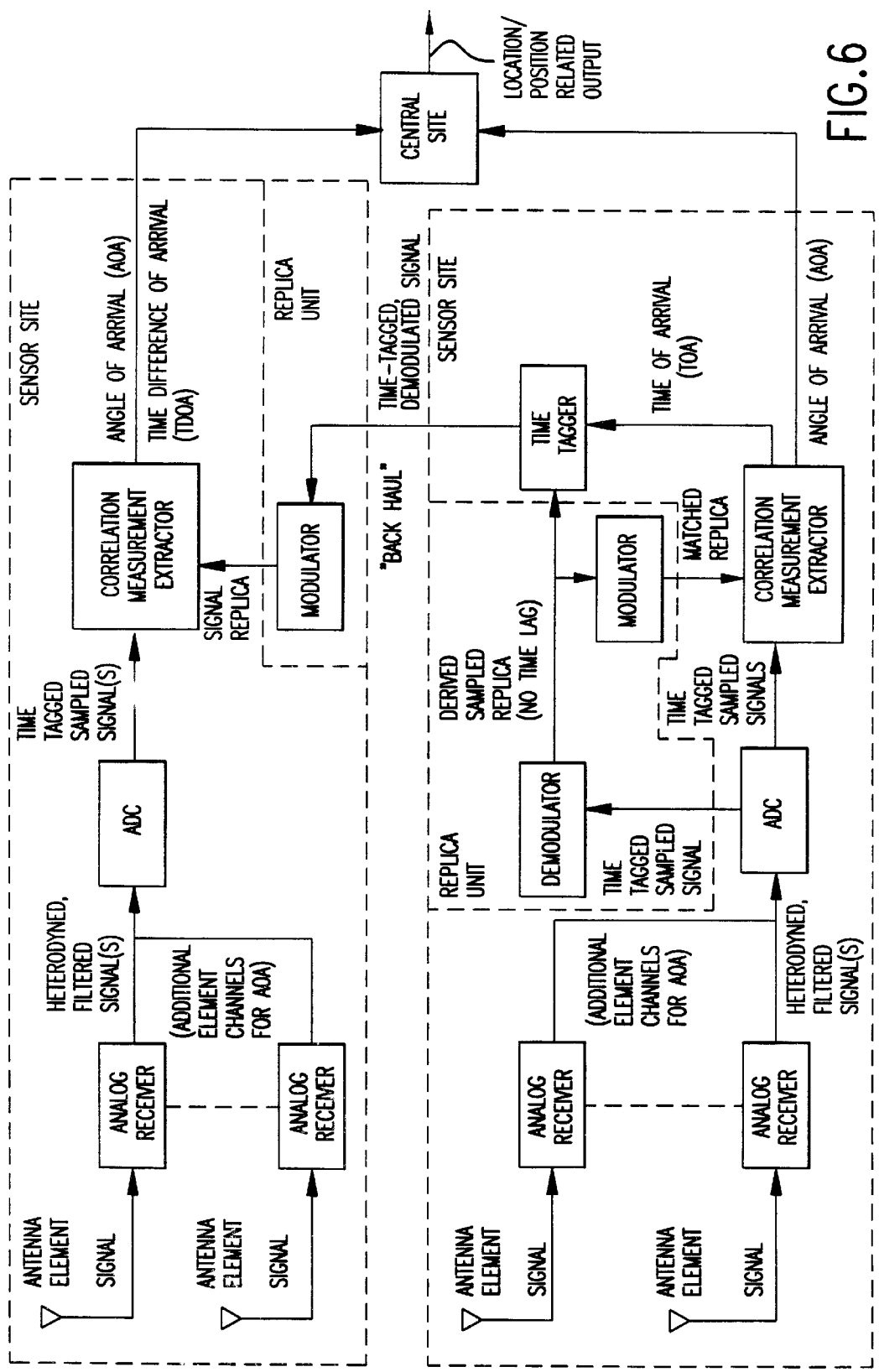
FIG. 6. Cooperative Sensor-Site Operation and data flow is shown in which the received signals at separated sites are routed to a common correlation with each other for the extraction of time-difference- and/or angle-of-arrival measurements to support centrally estimated locations.

Of course, the joint correlation is needed for the processing of any signals for which the waveform is not known in advance of reception and cannot be derived from the received signal. Correlation with the replica information obtainable by demodulation from a strong reception can also be used to cooperatively establish detection with and extract localization measurements from a weak reception that would otherwise not have been useful. In typical distributed, "cellularized" communications systems, the signals are received at cell base stations at discrete site locations distributed throughout the geographic region over which the communications services are provided, and the cell stations are linked through a communications backbone to central facilities to support the distributed communications services. In like manner, FIG. 6 represents the functional component configuration and data flows applied in cooperative sensor-site operation to support joint correlation analyses of potentially common signals received at two separated sites. In this cooperative operation, for correlation, a (digital) representation of one of the signals, i.e., the stronger of the two if significantly different in signal-to-noise power ratio (SNR), is communicated to the site at which the other signal is received. This supporting type of "back-haul" communication of signal representations to the common site for joint correlation constitutes an expensive component of the typical localization system that derives TDOA measurements for its localization determinations. The present invention applies replica data storage and reduction to eliminate or minimize the back-haul communications load.

The most direct (digital) representation of a signal is a direct copy of the (sampled) signal itself. In accord with the fundamental Nyquist theorem of signal processing, a signal must be sampled at a rate equivalent to at least twice the bandwidth of its information content in order to accurately represent that content. In the case of the frequency-modulated (FM) signals transmitted in the format of the Advanced Mobile Phone System (AMPS) specified in Electronics Industries Association/Telecommunications Industries Association specification EIA/TIA-553 and used as the "analog" cellular system standard in the U.S., the signal channels are separated by 30 kHz and hence can be represented by approximately 60 thousand samples per second. If approximately 50 dB of dynamic range is desired for each sample of the signal representation, then each sample would be 8 "bits ('b')" of information and the signal representation could consist of 480 thousand bits (480 kb) for each second of signal duration. The communication of such a quantity of data to support signal correlations is a burden, and an objective of the present invention is to alleviate or eliminate this back-haul communication load whenever possible.

8. "Matched Replicas"

The present invention provides a simple method and means to enhance the detectability of communications signals at one site or multiple sites, and to minimize or eliminate the need for excessive back-haul communications to support the correlation processing used for the detection of signal arrivals and the derivation of measurements for the localization of communications transceivers. In particular, the present invention applies effective and efficient matched-replica correlations to support the optimal detection and measurement of common signal localization parameters. In the application of the matched-replica approach, the potential received signal is "known" or derived at or provided to each receiving site, when the transmitted waveform can be inferred, or is communicated to the common correlation site(s), when the locally "unknown" signal waveform(s) are received and interpreted remotely. For a remotely received signal, the present invention uses a "reduced-data" form of the communicated waveform (e.g., the demodulated signal) to efficiently support correlation processing with a representation that does not require the inter-station transfer of a "high-fidelity image" of the waveform as transmitted. The use of correlations enables the extension of the correlation integration interval over a duration that significantly exceeds the interval used to detect the individual units or bits of "communication." The use of reduced-data representations of the signal replicas to support the correlations obviates the need to communicate complete signal copies to a common site for the correlation processing.

More specifically, in the AMPS networks employed in the U.S., the mobile-unit communications occur on separate frequency channels spaced at 30 kHz intervals and centered at approximately 835 MHz. Two types of communications occur: those on "Control Channels (CCs)" and those on "Voice Channels (VCs)." Whenever the mobile-unit user keys into the mobile unit a telephone number to be called and initiates the call, the embedded mobile-unit data processor causes the transceiver to transmit a CC message that has a duration of approximately 100 milliseconds (msec) and consists of data bits that are transmitted by frequency-shift-key (FSK) modulation at a rate of 10 thousand bits per second (bps), i.e., 10 kbps. Similarly, when the mobile unit is "called" by another caller, the communications system "pages" the mobile unit with a CC message, and the mobile unit responds with a CC FSK message also of approximately 100 msec duration and with an information rate of 10 kbps. In either case, upon receiving the CC message broadcast by the mobile unit, the communications system then selects a VC for the conduct of the conversation and transmits back to the mobile unit a message assigning the selected VC. The ensuing conversations then follow on the initial and subsequently assigned VCs. The voice signals are, of course, unknown in advance of reception, and are communicated by frequency modulation (FM) as they occur. Before transmission, the voice signals are companded and filtered, which reduces even further the bandwidth of signals that are already inherently limited by the range of the frequency content of the human voice. Thus, the initial CC message from the mobile unit is typically characterized by a signal of significantly greater bandwidth than that of the VC. Since it is well known [e.g., Weiss and Weinstein, op. cit.] that the accuracy with which a TDOA measurement can be estimated is inversely proportional to the signal bandwidth and to the square root of the time-bandwidth product, it is the CC message of a mobile unit operating under AMPS communications standards that provides the primary opportunity for its adequate localization through TDOA measurement techniques. In a fashion similar to AMPS, the voice communications provided by typical Specialized Mobile Radio (SMR) systems are also FM modulated, in 25 kHz channels, and are thus similarly limited in their effectiveness for TDOA determination. Nevertheless, to the extent that a VC signal will support the determination of TDOAs, its replica for correlation processing may be represented by either a segment of the sampled signal or a sampled segment of the FM-demodulated voice signal, which itself may be characterized by a bandwidth that is reduced relative to that of the FM transmission. Indeed even the data content of the sampled voice signal representation may be further reduced through linear predictive coding (LPC) and dynamic range companding, albeit with sufficient fidelity for accurate FM waveform reconstruction.

For a digital data message such as a communications control message, the simplest example of a reduced-data representation of the transmitted waveform is the communicated, extracted, demodulated data message itself. As mentioned previously, such a message may be represented by the relatively small average bit rate of approximately 10 kbps, whereas the transmitted waveform representation would require a much larger bit rate. The replica waveform is constructed from the message content through the use of the message-to-waveform transformation appropriate to the specifications of the particular communications system of interest. These transformations include various forms, such as the forms of FSK, QPSK, and DQPSK described in EIA/TIA and other specifications, as mentioned above and discussed further below.

The present invention can efficiently provide a location for a wireless communications transmitter, e.g., for an emergency 911 call to a Public Safety Answering Point (PSAP), by enabling the correlation detection of times of signal arrival (TOAs) and angles of signal arrival (AOAs) of the call-initiating CC transmission without the need for any communication of signal representations to a common correlator site. The necessary detections can each be derived with correlations at their respective receiving sites by using a matched replica of the CC signal that is reconstructed from the received CC message content, detected in real time or known in advance. In accord with the AMPS format standards [EIA/TIA-553] for all control messages, the transmitted CC signals begin with a "syncing" bit pattern, then follow with defined bits of information in a specific sequence that is repeated five times for communications reliability, and finally terminate with error detection and correction bit patterns. Thus, although each message may be uniquely composed of individual called and calling telephone numbers and an identifying serial number, the successful reception and demodulation of the message content provides the data stream at each site from which the FSK replica can be reconstructed for effective detection and parameter determination through correlation analysis. Indeed, it is the extracted representation of the demodulated control message that defines the transmitted replica, and enables its detection and parametric measurement to be determined with optimum robustness and accuracy through the correlator. Since the duration of the CC message is short and since the entire message can be received and decoded, all or any part of the replica can be reconstructed for use in the correlation to accurately identify the time of a selected specific instant in the content of the message (e.g., the end of the sync pattern or the beginning of the error detection pattern or the beginning of the first bit in the third repetition of the data content). As mentioned above, the parametric measurement accuracy is improved with the use of longer signal duration in the correlation process. With successful determination of location-related parameters, e.g., TOAs and/or AOAs, only the very small information content describing the measured parameter values and uncertainties, along with their site and time of measurement, needs to be communicated to a common site, where the differences in the TOAs, i.e., the TDOAs, can be calculated and/or where all location-related parametric data can be used to estimate the associated location of the transmitter.

A growing number of communications systems are emerging in which the voice content of the communications is "digitized" and then communicated via techniques such as code-division-multiple-access (CDMA) and time-division-multiple-access (TDMA), in either the North American (NA) TDMA or the Global System for Mobile Communications (GSM) TDMA forms, rather than via the analog FM techniques of the AMPS systems. Similarly, wireless data communications devices such as those used in Cellular Digital Packet Data (CDPD) systems transmit digitized information in accord with air-interface specifications that define their individual replica signal formats. With such "digital" systems, the digitized voice or data information content can be used to adequately represent the signal waveform which is needed for correlation to determine the desired estimates of TDOAs, AOAs, or other localization parameters. As described above, the digitized information content may consist of an information rate of approximately 10 kbps (ten thousand bits per second) or less, while the direct representation of the RF signal waveform would constitute several hundred thousand bits per second (or even several million bits per second, in the case of CDMA signals with coded bandwidths in excess of 1 MHz—one million Hertz). Thus, with the transmission to a common site of only the reduced "digital" information content in a segment of the voice communications received at separated sites, the information content can then be used to reconstruct the equivalent transmitted signal waveforms for application in the necessary correlation processing.

9. Specific Matched-Replica Construction/Reconstruction

Figure 7:
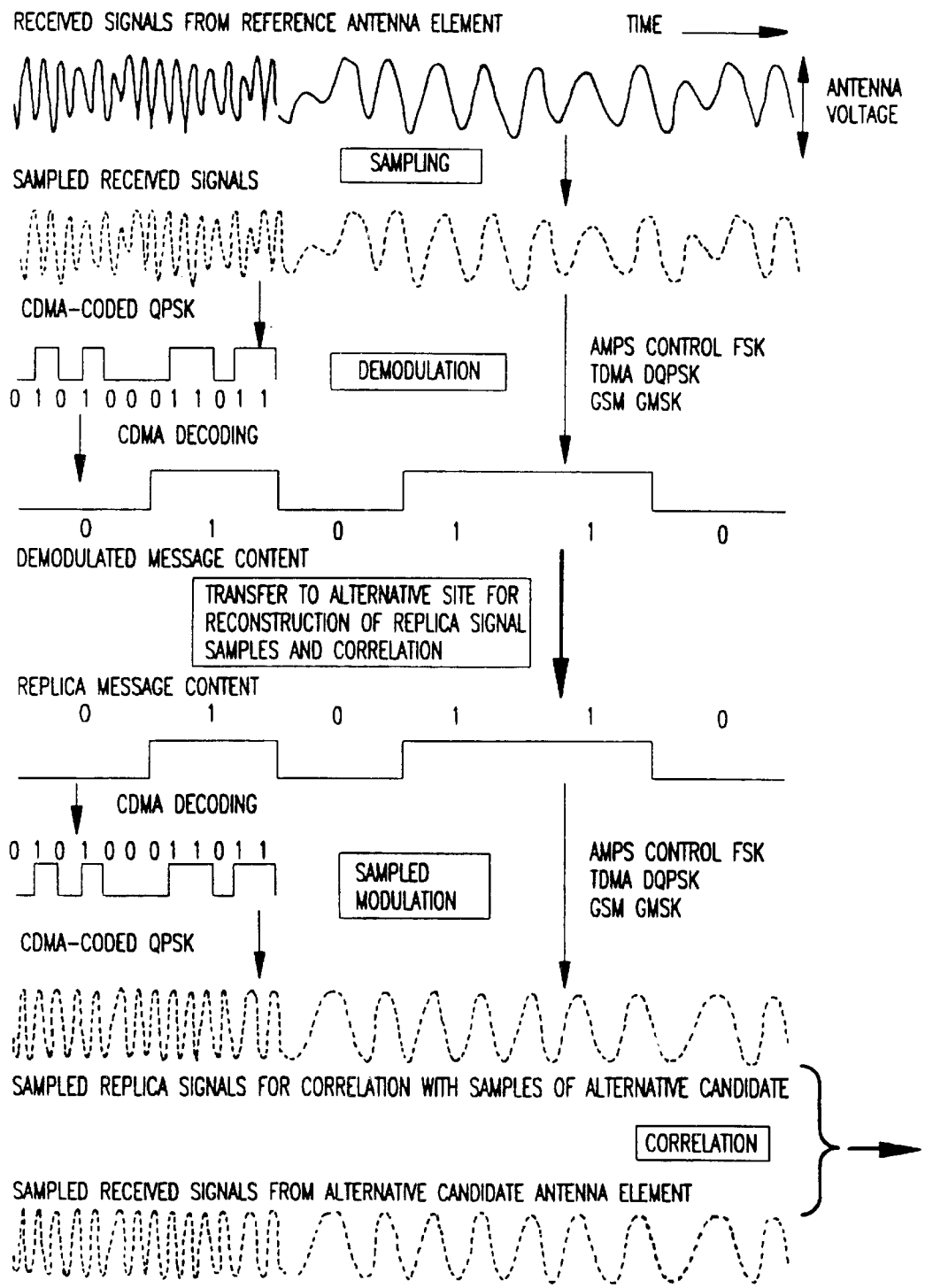
FIG. 7. Signal Replication is represented in the forms of the signal data that result from the successive stages of processing that support the preparation of the signal representations that are applied in the matched-replica correlations.

To support the correlation analyses, the signal reconstruction process is conducted in accord with the appropriate signal specification, which defines the particular system for representation of the zeros and ones in the information bit stream of each communications system. This signal replication process is summarized in FIG. 7 and is discussed in more detail in the following.

As mentioned above, the communications for the AMPS CC use FSK transitions specified in EIA/TIA-553. In accord with Manchester encoding techniques, these signals use a frequency transition from 8 kHz below the signal carrier frequency to 8 kHz above the carrier frequency to represent a "one," and a transition from 8 kHz above to 8 kHz below the carrier to represent a "zero." Such bits of information are communicated at a rate of 10 kbps for the AMPS CC standard.

For the CDMA communications described in TIA/EIA/IS-95, the message content bits are first encoded with "uncorrelated" bit streams unique to each transmitter, and then are transmitted as QPSK signals in which each pair of encoding bits is represented by one of four selected quadrature phases of the transmitted signal. While the message bits occur at rates up to 9600 bps, the encoded bit "chips" are transmitted at a rate of 1.2288 million chips per second (Mcps).

For TDMA transmissions in accord with the NA TDMA specifications in EIA/TIA/IS-54, the bits for a message occur at an average rate of 7800 bps and are transmitted in time bursts (with time-division access controlled by the managing system) at a burst rate of 24.3 thousand symbols per second (ksps), in which the message bits are represented in symbol pairs by the technique of differential-quadrature-phase-shift keying (DQPSK). With this method, each pair of bits is represented by a transition or difference in phase that is equal to one of a set of four selected phase changes. Similarly, a smoothed form of binary, offset DQPSK called Gaussian minimum shift keying (GMSK) is used for transforming the bit sequences to the TDMA transmissions used in the Global System for Mobile Communications (GSM) [e.g., as described by Michael Mouly and Marie-Bernadette Pautet in "The GSM System for Mobile Communications," Cell & Sys, 1992]. For CDPD transmissions, GMSK is used for the transformation and transmission of the message data bits at a rate of 19.2 kbps and the transmissions are overlaid into the voice channels of the AMPS configuration, with their 30 kHz channel spacing. Each of these system-specific signal waveforms can be appropriately constructed from the message bit stream that is intended for transmission. Thus, with the fully reconstructed and filtered representations of the transmitted signal waveforms, the signals applied in the correlation processing possess the full signal bandwidth that supports signal detection and parameter determination with optimal accuracy.

Through the use described above of the reduced-data signal representation and matched-replica reconstruction techniques, and the associated matched-replica correlation processing, the back-haul communications that support the correlation analyses can be significantly reduced, or even eliminated. The matched replica correlation processing also enables extended processing integration times to facilitate the detection of desired signal effects, even at distant sites in environments of strong, local, interfering signals. Thus, the present invention significantly enhances the robustness and efficiency and reduces the cost of implementation of correlation techniques for the detection and measurement of signal parameters at multiple sites to support the localization of communications signal transmitters, such as the wireless communications transmitters in cellularized communications systems.

10. Equipment and Processing

Equipment configurations for the reception of standard wireless communications for the purpose of localization will be largely composed of the same devices that are used in the implementation of the communications system itself. For example, the antenna configurations and signal reception components shown in FIGS. 5 and 6 may actually be the same as those applied in providing the communications services. The phased arrays used to support AOA measurements employ the same technology and may be the same as the "smart arrays" currently being implemented to provide "spatial-division-multiple-access" communications services in some locales with enhanced capacity and frequency reuse. To support TOA and TDOA determinations of useful locations, the digitization or sampling of the signals at the distributed sensor sites must be synchronized and time-tagged to within (at most) one-half microsecond. This may be achieved through the use of stable, calibrated oscillators, such as those in rubidium clocks or Global Positioning System (GPS) time bases, and maintained with periodic recalibration of the timing standards in each sensor site. The stability or drift rate of the oscillator standard determines how often the recalibration with signals from known locations must be performed. Similarly, for the phased-array determination of useful AOAs, periodic recalibration of equipment-specific, inter-element, phase-difference offsets must be performed, but only as often as needed to account for temperature and other environmental drift effects on the analog RF equipment, and inter-site time synchronization needs to be maintained, but to only approximately one-half second.

The digital correlation signal processing for the present invention is similar, or identical in the case of CDMA, to that applied in the "software radio" reception equipment employed for the provision of communications services. This processing, for the correlation measurement extractors shown in FIGS. 5 and 6, may be accomplished by digital signal processing devices that are specially designed for efficient communications processing, or may alternatively be performed with general purpose signal processing devices, such as the scaleable multiprocessor board manufactured by Pentek, Inc. of Upper Saddle River, N.J., and designed to use four TMS320C6201 digital signal processing chips manufactured by Texas Instruments, Inc. of Dallas, Tex. As the capabilities of digital signal processing facilities advance and the price-to-performance ratio declines, increasingly more of the functionality currently allocated to the analog signal conditioning equipment described above will be allocated to digital signal processing devices. With the digital signal processing approaches, signal integrity is maintained or significantly enhanced while increased functionality and flexibility is added.

Figure 8A:
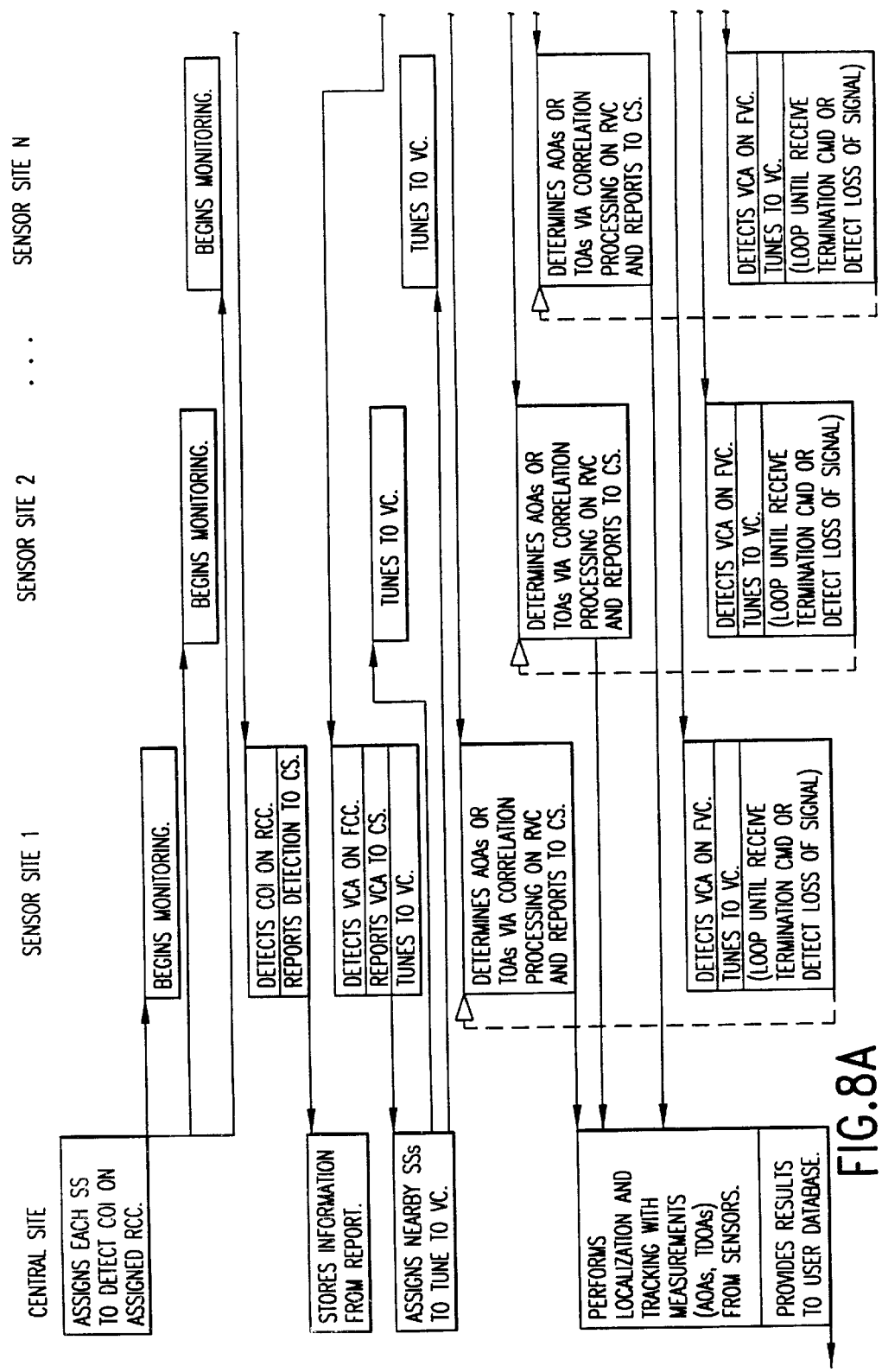

The control flow for the functional direction of the multiple sensor site (SS) assets by the central site (CS) may be represented for one embodiment as shown in FIG. 8. In this flow, the control site distributes the responsibility for obtaining and reporting location-related measurements on the communications calls of interest (COIs). The sensor sites also report the detection of initiated communications on the reverse control channels (RCCs) and the voice channel assignments (VCAs) provided on the forward control channel (FCC) and subsequently on the forward voice channel (FVC) by the communications system to the mobile caller unit. In response to VCAs, the SSs coordinate their assignments for reporting with the CS and also tune to and follow the COIs to produce ongoing location-related measurements to the CS, until the CS terminates such an assignment or the signal of interest is lost. In the embodiment shown in FIG. 8, the location-related measurements are derived from the voice signals alone. In an alternative embodiment, the sensor sites may continuously monitor communications control signals for the derivation of location-related measurements from them when they occur. In such an embodiment, the sensor sites also report such localization data to the CS when detected at the time of initiation of the communications.

Through the application of standard statistical analysis procedures [e.g., as described in Jazwinski, "Stochastic Processes and Filtering Theory," Academic Press, 1970], the TDOA-based range-difference measurements and AOA-based measurements of LOBs, and their associated uncertainty information, can be analyzed to provide estimates of the associated mobile unit locations and velocities. The knowledge representation of the measurement information and its uncertainty can take numerous forms, such as discrete attribute vectors in which each element of the vector represents the value of a particular discrete attribute where the values may be boolean, integer, floating point, or symbolic, and particular choices of the values will have attendant confidences; continuous numeric parameters with associated statistical errors; and/or fuzzy logic parameters. The localization evaluation processing can employ any or a combination of numerous analysis and uncertainty management systems, each suited to the appropriate knowledge representation. Examples of such analysis approaches include maximum likelihood or least squares estimators, joint probabilistic data association algorithms, probability density function multi-target tracking systems for continuous parameters, multi-hypothesis uncertainty management systems, rule-based expert systems with multi-confidence production rules that combine discrete logical assertions with continuous numeric information, fuzzy logic engines, and causal belief networks. The specific method, form, or implementation of the analyses that are applied to obtain a location estimate from the location-related data is not the subject of the present invention.

The localization estimates resulting from such analyses may be represented in graphical, tabular, or internal processor-data format, and may be presented or displayed either on displays that are integral to the data collection and analysis equipment or that are embodied in equipment that is remote from such equipment. The particular method, form, and location for representation of the localization results are also not the subject of the present invention.

The processing and display facilities required for the execution of the sensor site control and management, the localization and tracking calculations, the storage and retrieval of the localization data, and the display and interaction with users of the localization and system management data are readily implemented with an integrated set of current versions of general purpose personal computer configurations. These configurations may include a network of processors and workstations that are based, for example, on the Intel Pentium or Motorola Power PC processor chips.

In the interests of public benefit, the locations obtained through the efficient application of the above techniques can be most beneficially applied to rapidly direct a wireless call for assistance to the Public Safety Answering Point (PSAP) that is closest to the location of need or has jurisdictional responsibility for calls for help from that location. In particular, the location-related measurement data derived from correlations that are performed at the receiving sites with locally derived replicas, or with stored replicas of those portions of the initiating control messages that are known in advance, can be accomplished more rapidly than can processing that requires data from another site after signal reception. Thus, the present invention can further apply location-related measurements, derived without the need for cooperative inter-site transfer of signal-replica data, to more quickly evaluate the localization calculations and obtain the location for the call-routing algorithm to rapidly and accurately direct the call to the appropriate location-determined response point.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously thought of. Numerous variations and changes can be made to the foregoing illustrative embodiments without departing from the scope and spirit of the present invention as set forth in the appended claims.

What is claimed is:

1. An apparatus for measuring an angle-of-arrival of a signal from a wireless communications transceiver comprising:
   a local phased-array antenna, comprising first and second antenna elements, and associated signal conditioning means for receiving first and second versions of a signal from the wireless communications transceiver, said first version being received via said first antenna element and said second version being received via said second antenna element;
   a signal characterization processing unit for generating replicated signal data, wherein said replicated signal data comprises a representation of the signal from the wireless communications transceiver which is substantially devoid of noise or distortion corruption; and
   a signal correlation processing unit at the sensor station for performing matched-replica correlation processing to produce an angle of arrival (AOA) of the signal from the wireless communications transceiver;
   wherein said matched-replica correlation processing comprises (a) generating a first correlation function by correlating said replicated signal data with said first version, (b) generating a second correlation function by correlating said replicated signal data with said second version, and (c) generating a third correlation function by correlating said first correlation function with said second correlation function, wherein said third correlation function is indicative of the AOA of the signal from the wireless communications transceiver.

2. An apparatus as claimed in claim 1, wherein the replicated signal data comprises prior known protocol forms of the signal from the wireless communications transceiver.

3. An apparatus as claimed in claim 1, wherein the replicated signal data comprises representative signal data derived from the received signal.

4. An apparatus as claimed in claim 1, further comprising an antenna and a signal characterization processing unit that are remote from the local phased-array antenna, the remote antenna and signal characterization processing unit generating a representation for the replicated signal data.

5. An apparatus as claimed in claim 1, wherein the correlation processor correlates the replicated signal data with the first and second versions for an extended integration time.

6. An apparatus as recited in claim 1, further comprising a mechanism for using AOA information to rapidly direct a wireless 9-1-1 call to a Public Safety Answering Point (PSAP).

7. An apparatus as recited in claim 1, wherein the received signal is a code division multiple access (CDMA) signal.

8. An apparatus as recited in claim 7, wherein the received signal is a CDMA voice or traffic channel signal.

9. An apparatus for measuring an angle-of-arrival of a signal from a mobile radio transmitter, comprising:
   a local phased-array antenna and associated signal conditioning means for receiving a signal from the mobile radio transmitter;
   a signal characterization processing unit for generating replicated signal data; and
   a signal correlation processing unit for performing matched-replica correlation processing with received signal data and replicated signal data to produce an angle of arrival of the received signal; wherein the correlation processing unit correlates the received signal data to produce coefficients incorporating the inter-element phase information which are used in a correlation to obtain measurements of signal angle-of-arrival (AOA) according to the relation:

$$\sin(AOA - bisector) \approx \frac{1}{kb} \arg\left[\frac{1}{S} \int R_{01}^*(t_{\max}(s)|s, T) R_{02}(t_{\max}(s)|s, T) ds\right]$$

where the AOA difference relative to the angle of the bisector of the inter-element baseline is related to the "argument" of the complex average over a time interval S of the conjugate product of the external correlation coefficients, $R_{01}^*(t_{max}(s)|s, T)$ and $R_{02}(t_{max}(s)|s, T)$; $k$ is the approximate wavenumber of the signal; $b$ is the inter-element separation; and the "arg" function extracts the phase of the zero-lag correlation of the correlation coefficients $R_{01}$ and $R_{02}$.

10. A method of measuring an angle-of-arrival of a signal from a wireless communications transceiver, comprising:
   receiving first and second versions of a signal from the wireless communications transceiver at a local phased-array antenna comprising first and second antenna elements, said first version being received via said first antenna element and said second version being received via said second antenna element;
   generating replicated signal data, wherein said replicated signal data comprises a representation of the signal from the wireless communications transceiver which is substantially devoid of noise or distortion corruption; and
   performing matched-replica correlation processing to produce an angle of arrival (AOA) of the signal from the wireless communications transceiver at the local phased-array antenna;
   wherein said matched-replica correlation processing comprises (a) generating a first correlation function by correlating said replicated signal data with said first version, (b) generating a second correlation function by correlating said replicated signal data with said second version, and (c) generating a third correlation function by correlating said first correlation function with said second correlation function, wherein said third correlation function is indicative of the AOA of the signal from the wireless communications transceiver.

11. A method as claimed in claim 10, wherein the replicated signal data comprises prior known protocol forms of the signal from the mobile radio transmitter.

12. A method as claimed in claim 10, wherein the replicated signal data comprises representative signal data derived from the received signal.

13. A method as claimed in claim 10, further comprising an antenna and a signal characterization processing unit that are remote from the local phased-array antenna, the remote antenna and signal characterization processing unit generating a representation for the replicated signal data.

14. A method as claimed in claim 10, wherein the correlation processor correlates the replicated signal data with the first and second versions for an extended integration time.

15. A method as recited in claim 10, wherein the matched-replica correlation processing step comprises correlating the received signal data to produce coefficients incorporating the inter-element phase information, and wherein said coefficients are used to obtain measurements of signal angle-of-arrival (AOA)

$$\sin(AOA - bisector) \approx \frac{1}{kb} arg\left[\frac{1}{S}\int R_{01}^*(t_{\max}(s)|s, T)R_{02}(t_{\max}(s)|s, T)ds\right]$$

wherein the AOA difference relative to the angle of the bisector of the inter-element baseline is related to the argument of the complex average over a time interval S of the conjugate product of external correlation coefficients, $R_{01}^*$ ($t_{max}(s)|s$, T) and $R_{02}$ ($t_{max}(s)|s$, T); k represents the approximate wavenumber of the signal; b represents the inter-element separation; and the "arg" function extracts the phase of a zero-lag correlation of the correlation coefficients $R_{01}$ and $R_{02}$.

16. A method as recited in claim 10, further comprising using AOA information to rapidly direct a wireless 9-1-1 call to a Public Safety Answering Point (PSAP).

17. A method as recited in claim 10, wherein the received signal is a code division multiple access (CDMA) signal.

18. An apparatus as recited in claim 17, wherein the received signal is a CDMA voice or traffic channel signal.

* * * * *